W. R. JONES.
QUICK REPAIR DEVICE FOR HOLES IN METALLIC HOLLOW WARE.
APPLICATION FILED JULY 26, 1918.
1,285,210.
Patented Nov. 19, 1918
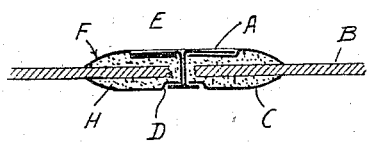
FIG. 1
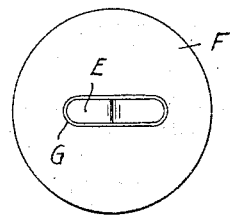
FIG. 2
FIG. 5
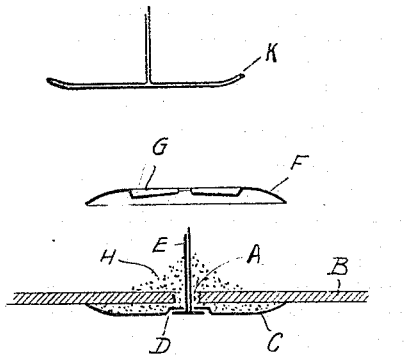
FIG. 3
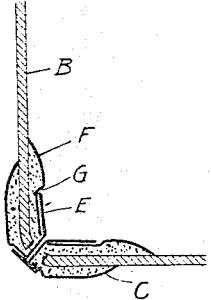
FIG. 4
INVENTOR:
William Ross Jones
By Wm Wallace White
ATTY.

UNITED STATES PATENT OFFICE.

WILLIAM ROSS JONES, OF DOUBLE BAY, NEAR SYDNEY, NEW SOUTH WALES, AUSTRALIA.

QUICK-REPAIR DEVICE FOR HOLES IN METALLIC HOLLOW WARE.

1,285,210.  Specification of Letters Patent.  Patented Nov. 19, 1918.

Application filed July 26, 1918. Serial No. 246,950.

*To all whom it may concern:*

Be it known that I, WILLIAM ROSS JONES, subject of the King of Great Britain and Ireland, residing at Manning Road, Double Bay, near Sydney, New South Wales, Australia, have invented new and useful Improvements in Quick-Repair Device for Holes in Metallic Hollow Ware, of which the following is a specification.

To obviate soldering or brazing metallic hollow ware to close holes burnt or worn therein it has been already proposed to secure a metal disk at either side of the fault by means of a bolt passed through it, with a packing of cork under one of said disks. This device is objectionable in that the bolt ends protrude, in that the cork packing is ineffective for closing faults in the chime of the vessel, and in that the cork packing soon fails if the vessel be left in a dry condition on a hot stove. My invention has primarily for its object the ready repair of worn and faulty culinary and other domestic utensils by a device which may be fixed quickly, which is not destroyable by stove heat, and which does not project substantially at either side of the vessel.

My said device consists of a pair of thin cupped washers made of iron, or tinned iron, with a "split" fastener which serves to fix said washers together, one on either side of the vessel with an "iron cement" filling inclosed by them covering the fault. The cement soon sets when wetted after the fastener has been closed, and the metal of the faulty vessel and the washers and the fastener are effectively cemented solidly together so that leakage can no longer take place through the fault. When the repair is required on the chime of the vessel the washers are bent to adapt them to it; they are made of sufficiently thin flexible metal to facilitate bending. The iron cement used may consist of fine iron filings with a small proportion of salammoniac and sulfur, but any known "iron cement" may be used which is capable of setting and uniting with metal when wetted so as to produce a heat proof insoluble joint.

In the accompanying explanatory drawings, Figure 1 is a section view through a repair in a metal plate effected as hereinbefore described. Fig. 2 is a plan view of the cover washer showing the split fastener closed; Fig. 3 is an exploded section corresponding with Fig. 1, the backing washer, the cement, and the fastener being shown ready for the placing of the cover washer to complete the repair; and Fig. 4 is a section similar to Fig. 1, showing a repair in the chime or bottom edge of a sheet metal kettle or like domestic utensil. Fig. 5 is a sectional view illustrating the preferred form of the device in which the split fastener is formed of two tongues integral with one of the disks and folded back into said disk, while the other disk is identical with the corresponding part shown in the other figures. All these views are exaggerated in dimension to facilitate description; in practice the dimensions of the parts are about one half of the dimensions shown.

Referring to Figs. 1 to 4 A is a hole or fault in a metal sheet, B, for which a repair is required, C is the backing washer, D embossed countersink therein to accommodate the head of the sheet metal "split fastener" E, F the cover washer, G embossed countersink therein to accommodate the ends of the fastener E when same are "closed" as shown in Figs. 1, 2 and 4. Both washers are pierced centrally to accommodate the fastener, H is the filling or packing of iron cement inclosed between the washers and the two surfaces of the faulty metal. The washers are cupped sufficiently to carry a sufficient body of cement to make the joint without being bulky. The process of filling and closing the joint is best shown in Fig. 3. To facilitate spreading the fastener legs to close them, they are made of unequal length, as best seen in Fig. 3. When the fastener is closed, its head and its ends set flush in the countersinks, and sufficient cement oozes through the holes in the washers to fix the exposed parts of the fastener tightly to the washers so that it becomes irremovable in ordinary use and cleaning of the utensil.

Referring to Fig. 5, the split fastener instead of being made separately from the head washer is made integral with it. In cutting the head washer, two tangs are formed integral with it; these are bent back into the cupped side of the washer as shown at K, and their ends bent upwardly to project centrally from said washer. These projecting ends form the split fastener. They are like the independent split fasteners already described, passed through the eye of the backing washer and closed down into the countersink therein, the two washers being first filled with cement to lute the joint upon which the washers are secured.

What I claim as my invention and desire to secure by Letters Patent is:—

1. A quick repair device for holes in metal hollow ware, comprising two cupped disks of metal adapted to inclose iron cement packing and a sheet metal "split" fastener projecting from one of said disks adapted to be passed through a hole and to be closed into a countersink in the other of said disks.

2. A quick repair device for holes in metal hollow ware consisting of two cupped washers adapted to hold "iron cement" luting on the joint and a "split" fastener adapted to be closed flush on said washers to secure them together and embrace said cement over either surface adjacent the joint.

3. A quick repair device for holes in metal hollow ware consisting of a pair of cupped washers inclosing "iron cement" packing, and a "split" fastener passed through the fault and closed flush on said washers to hold them up to either side of the fault.

In testimony whereof I have signed my name to this specification in the presence of two subscribing witnesses.

WILLIAM ROSS JONES.

Witnesses:
  W. I. DAVIS,
  H. C. CAMPBELL.

Copies of this patent may be obtained for five cents each, by addressing the "Commissioner of Patents, Washington, D. C."